(12) United States Patent  
Schubert

(10) Patent No.: US 6,297,471 B1  
(45) Date of Patent: Oct. 2, 2001

(54) WORKING HEAD FOR PROCESSING A WORKPIECE BY MEANS OF A LASER BEAM

(75) Inventor: Peter Schubert, Gaggenau (DE)

(73) Assignee: precitec GmbH, Rotenfels (DE)

( * ) Notice: Subject to any disclaimer, the term of this patent is extended or adjusted under 35 U.S.C. 154(b) by 0 days.

(21) Appl. No.: 09/522,614

(22) Filed: Mar. 10, 2000

(30) Foreign Application Priority Data

Mar. 11, 1999 (DE) ............................................ 299 04 489 U

(51) Int. Cl.[7] .................................................... B23K 26/00
(52) U.S. Cl. .................................. 219/121.78; 219/121.83
(58) Field of Search ........................... 219/121.6, 121.63, 219/121.65, 121.67, 121.78, 121.82, 121.83

(56) References Cited

U.S. PATENT DOCUMENTS

| | | | |
|---|---|---|---|
| 4,924,063 | * 5/1990 | Buchel et al. ................... | 219/121.64 |
| 5,548,098 | * 8/1996 | Sugawara et al. .............. | 219/121.67 |
| 5,624,587 | * 4/1997 | Otsuki et al. ................... | 219/121.83 |
| 6,043,452 | * 3/2000 | Bestenlehrer ................... | 219/121.62 |

* cited by examiner

*Primary Examiner*—Samuel M. Heinrich  
(74) *Attorney, Agent, or Firm*—Birch, Stewart, Kolasch & Birch, LLP

(57) ABSTRACT

A working head according to the invention for processing a workpiece by means of a laser beam includes a housing with an inlet opening and an outlet opening for the laser beam; a focusing optical system for focusing the laser beam at a point outside the housing at a spacing upstream of the outlet opening; and a measuring arrangement, surrounding the outlet opening, for measuring a spacing between it and the workpiece in the propagation direction of the laser beam, the laser beam traversing the focusing optical system and the outlet opening and measuring arrangement along beam axes which are at an angle to one another.

18 Claims, 2 Drawing Sheets

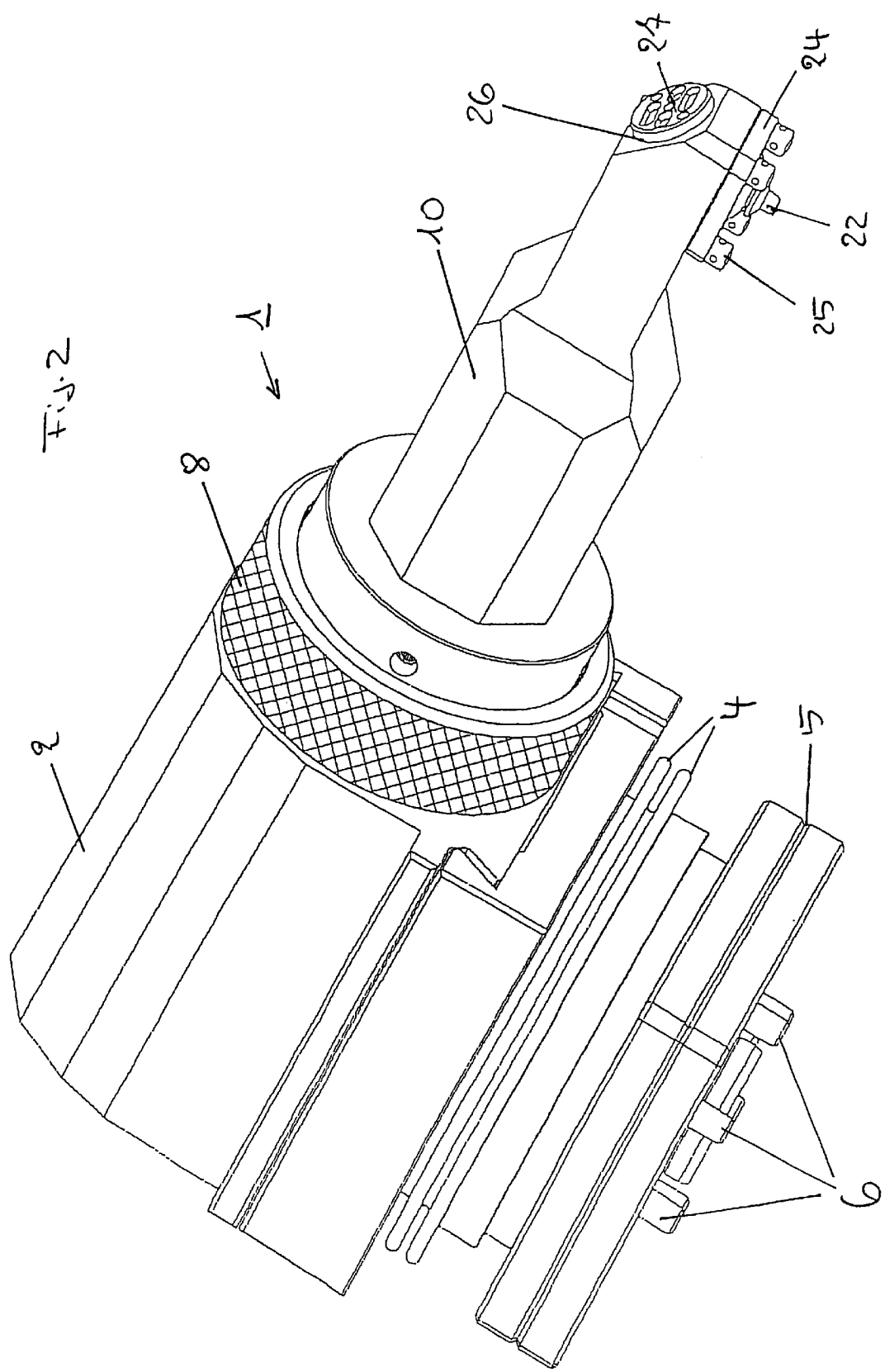

WORKING HEAD FOR PROCESSING A WORKPIECE BY MEANS OF A LASER BEAM

BACKGROUND OF THE INVENTION

1. Field of the Invention

Figure 1:
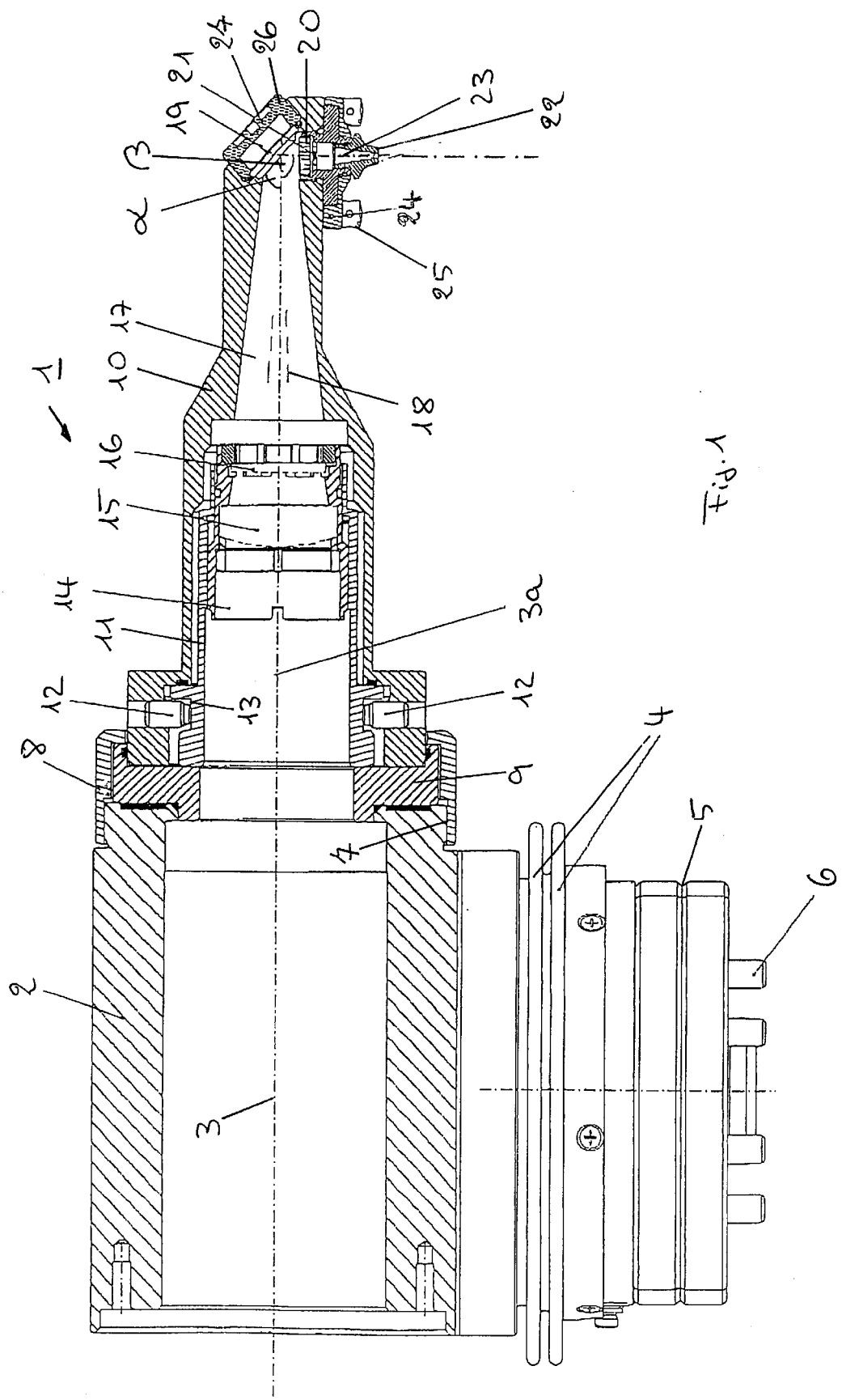

The invention relates to a working head for processing a workpiece by means of a laser beam.

2. Description of Relevant Art

The need frequently occurs to carry out work, for example welding or cutting work, by means of a laser beam in the interior of relatively small workpieces. In this case, it is necessary to accurately position the focus of the laser beam relative to the inner surface of the workpiece.

SUMMARY OF THE INVENTION

It is the object of the invention to create a working head suitable for this purpose.

A working head according to the invention for processing a workpiece by means of a laser beam includes a housing with an inlet opening and an outlet opening for the laser beam; a focusing optical system for focusing the laser beam at a point outside the housing at a spacing upstream of the outlet opening; and a measuring arrangement, surrounding the outlet opening, for measuring a spacing between it and the workpiece in the propagation direction of the laser beam, the laser beam traversing the focusing optical system and the outlet opening and measuring arrangement along beam axes which are at an angle to one another.

It is also possible with the aid of such a working head to carry out work in the interior of relatively small workpieces and/or cavities, or in the interior of tubes having a relatively small inside diameter, because the extent of the working head transverse to its longitudinal axis is usually very much smaller than in the direction of its longitudinal axis. If such a working head is pushed into the interior of the workpiece, the laser beam emerging laterally from it can be used to carry out the desired work. Moreover, the measuring arrangement surrounding the outlet opening permits the spacing between it or the laser processing head, on the one hand, and the workpiece, on the other hand, to be accurately set or kept constant, as a result of which the focus of the laser beam can be positioned relative to the workpiece in a way desired, which leads to an improved work result.

According to a refinement of the invention, the angle between the said beam axes through the focusing optical system, on the one hand, and the outlet opening or measuring arrangement, on the other hand, can be 90°, with the result that the working head is suitable, in particular, for working in the interior of cylindrical or square tubes or tubes of other geometries. However, the said angle can also have other values, depending on the shape of the interior of a workpiece to be processed internally. For work inside a conical cavity, it would be possible given alignment of the processing head in the longitudinal direction of the cone to set the said angle such that the laser beam strikes perpendicularly on the internal conical surface.

In order to be able to adapt the angle between the respective beam axes to the respectively prevailing geometrical conditions in the interior of workpieces, according to an advantageous development of the invention, a part of the housing of the processing head which contains the outlet opening can be tilted and/or pivoted relative to a housing part containing the focusing optical system. As a result, the processing head can be used universally, including the case of the most varied internal geometries of workpieces.

In a refinement of the invention, a deflecting element for deflecting the laser beam is arranged in the beam path between the focusing optical system and outlet opening, the deflecting element being constructed, for example, as a plane mirror. Also possible, however, are other deflecting elements, for example concave mirrors, deflecting elements operating on the basis of a hologram, and the like, which can also be tuned to the respective optical properties of the focusing optical system.

The deflecting element can be inserted in this case into an opening of the housing from outside so that, if required, it can be taken out again relatively quickly, in order to be replaced by another, for example in the case of damage, or given the presence of other geometrical conditions.

For this purpose, the deflecting element is preferably seated on a support which can be connected to the housing, for example screwed in. In this case, the support can also be provided with cooling ribs on its outer surface in order to ensure better cooling of the deflecting element.

The working head according to the invention can be used as a measuring arrangement. A sensor electrode made from metallic material, is provided on the working head the spacing between it or the working head, on the one hand, and the workpiece, on the other hand, can be measured in a capacitive way when the workpiece consists of metal. Such a measuring technique is generally known and is not to be explained here further.

However, the measuring arrangement can also be present in the form of a coil which concentrically surrounds the outlet opening of the working head, with the result that the spacing between the measuring arrangement or the working head, on the one hand, and the workpiece, on the other hand, can then be measured in an inductive way. This measuring technique is also generally known and is not further explained here.

In a further refinement of the invention, the focusing optical system can be displaced inside the housing on and perpendicular to its axis of symmetry and/or central axis, in order to be able to undertake adjustment of the laser beam relative to the outlet opening.

Moreover, a protective lens can be arranged in the beam path in the region between the deflecting element and outlet opening, in order to protect the deflecting element, which is situated relatively close to the outlet opening, from outside against damage, for example against damage by metal splashes which are produced during processing of the workpiece by means of laser beam.

Again, a protective lens could be arranged in the beam path in the region between the deflecting element and focusing optical system, in order also to be able to protect the focusing optical system better from external influences. The two previously mentioned protective lenses are in this case respectively flowed around by protective gas which likewise emerges from the outlet opening during processing of the workpiece by means of the laser beam.

According to another, very advantageous development of the invention, the region of the housing of the working head situated between the focusing optical system and deflecting element can be constructed as a telescope, so that it is possible in the longitudinal direction of the working head to change the spacing between the deflecting element or outlet opening, on the one hand, and focusing optical system, on the other hand. It is thereby possible, if required, to displace the processing site even further into the interior of a workpiece into which the head, with its relatively wide end part, cannot be moved any more. In order in this case to take account of the change in focal length, the focusing optical system can likewise vary its focal length correspondingly as a function of the length of the telescope. The position of the focus of the laser beam relative to the outlet opening therefore also remains constant permanently, even in the case of a change in the spacing between the outlet opening and focusing optical system.

Finally, it is also possible for the region of the housing of the working head situated upstream of the focusing optical system in the beam direction to be constructed as a telescope, in order thereby to be able to vary the working region in the interior of a workpiece, if required, when the relatively large end part of the working head can no longer be moved into it.

The invention is explained in detail below with reference to an exemplary embodiment. In the drawing:

FIG. 1 shows a longitudinal section through a working head according to the invention which is constructed as an internal pipe cutter; and FIG. 2 shows a perspective outer view of the working head according to FIG. 1.

The working head according to FIGS. 1 and 2 bears the reference numeral 1 and firstly has a collimator holder 2, constructed in a hollow cylindrical fashion, having a cylinder or central axis 3. The collimator holder 2 rests over an anticollision device 4 on a support element 5 which has on its underside fastening means 6 via which the support element 5 is mounted, for example, on a carriage of a processing system. It is therefore possible to control the movement of the processing head 1 by displacing the carriage (not represented). If it is moved inadvertently against a workpiece structure, the mechanical anticollision device 4 yields, and thereby prevents damage to the working head 1.

In FIG. 1, laser radiation enters the collimator holder 2 from the left, and leaves it on its beam exit side. Located outside on this beam exit side of the collimator holder 2 is a circumferential thread 7 onto which a retaining ring 8 can be screwed. After being screwed onto the circumferential thread 7 of the collimator holder 2, this retaining ring 8 presses an intermediate ring 9 against the end face of the collimator holder 2 on the beam exit side, on which intermediate ring, for its part, a front head part 10 of the working head 1 is fastened on the beam exit side. By loosening the retaining ring 8, it is thereby possible for the unit consisting of the intermediate ring 9 and front head part 10 to be removed from the collimator holder 2 and, if appropriate, replaced by another one, should this be necessary.

The front head part 10 has a central axis 3a which is situated coaxially with the central axis 3 of the collimator holder 2 and is aligned therewith when the front head part 10 is fastened on the collimator holder 2. Moreover, there is located in the region of the front head part 10 on the beam exit side a retaining tube 11 which is situated coaxially with the central axis 3a of the front head part 10. This retaining tube 11 can be positioned in its radial position relative to the front head part 10 via at least three radial pins 12 acting from outside. In this case, the radial pins 12 are screwed into threaded through bores which are located in the section of the front head part 10 on the beam exit side. The radial pins 12 are distributed at equal angular spacings in the circumferential direction of the front head part 10. They engage in a circumferential groove 13 which is located on the outer surface of the retaining tube 11, with the result that in this way the retaining tube 11 is centred in terms of its longitudinal or axial direction relative to the front head part 10.

At least in its region on the beam exit side, the retaining tube 11 is provided with an internal thread into which a lens cassette 14 having a corresponding external thread can be screwed, specifically starting from the surface of the retaining tube 11 (on the right in FIG. 1) on the beam exit side. Located inside the lens cassette 14 is a focusing optical system 15 for focusing the laser beam, which is fed in a parallel fashion from the left in FIG. 1. The lens cassette 14 can be sealed on the beam exit side with a protective lens 16 which is fastened on the lens cassette 14 and situated on the beam exit side relative to the focusing optical system 15. By screwing the lens cassette 14 into the section of the retaining ring 11 on the beam exit side, it is therefore possible to set or adjust the focusing optical system 15 in the laser beam direction relative to the front head part 10. The focusing optical system 15 is arranged permanently inside the lens cassette 14.

The inner channel 17 of the front head part 10 tapers in the beam direction on the beam exit side relative to the focusing optical system 15. For the sake of clarity, the laser beam 18, which is now focused, is illustrated in part with dashes. This laser beam 18 is situated coaxially with the central axis 3a of the front head part 10, and strikes a deflecting mirror 19 which is inclined at an angle α of 45° relative to the central axis 3a. After reflection at the deflecting mirror 19, the laser beam 18 runs on in a focused fashion in a direction which is at an angle β of 90° to the central axis 3a. It then passes to the outside through a lateral outlet opening 20 located in the front head part 10.

A further protective lens 21, which protects the mirror 19 from external influences, can be located inside the lateral outlet opening 20. Moreover, a nozzle electrode 22 is inserted into the lateral outlet opening 20 on the beam exit side relative to the protective lens 21. The nozzle electrode 22 has an inner channel 23 which tapers conically in the beam direction and through which the laser beam 18 passes to the outside. Up to the region of the tip of the nozzle electrode 22, which consists of metal, said electrode is covered by an electrically insulating protective cap 24 which is fastened with the aid of fastening elements 25, for example screws, on the front head part 10 and holds the nozzle electrode 22 in the process. The metallic nozzle electrode 22 can be used to measure in a capacative way the spacing between it or the working head 1, on the one hand, and a workpiece to be processed, on the other hand, for which reason a suitable electric measuring potential is applied to the nozzle electrode 22. It is fed to said electrode via lines which are laid in the interior of the working head 1. The protective cap 24 consisting of an electrically insulated material serves to prevent a short circuit owing to metallic splashes from outside which could otherwise, as the case may be, cause a short circuit between the front head part 10 and nozzle electrode 22. The nozzle electrode 22 is electrically insulated from the front head part 10 by an insulating coating (not represented).

It may further be mentioned that the deflecting mirror 19 rests on a support element 26 which can, for its part, be inserted into an opening in the front head part 10, for example can be screwed in. In this case, the support element 26 on its exposed outer surface can be provided with cooling ribs 27, in order to ensure better cooling of the deflecting mirror 19.

In a modification of the exemplary embodiment shown in FIGS. 1 and 2, the tip of the front head part 10 could also be constructed in an articulated fashion such that it is possible for the nozzle electrode 22 to be pivoted relative to the central axis 3a of the front head part 10. In this case, the laser beam could emerge from the nozzle electrode 22 in a direction which is at an angle of less than or more than 90° relative to the central axis 3a of the front head part 10. When the nozzle electrode 22 is being pivoted, it would then be necessary to ensure that the deflecting mirror 19 is also correspondingly pivoted, in order then to be able to lead the laser beam 18 through the now newly positioned nozzle channel 23.

In all cases, a protective gas can be led through the nozzle channel 17 and then emerge from the nozzle electrode 22 together with the laser beam 18. In this case, the protective gas can flow around the protective lenses 16 and/or 21. The protective gas is applied to the focusing optical system 15 on the beam exit side. Appropriate feeds for the protective gas have been left out in the figures for the sake of clarity.

What is claimed is:

1. A working head for processing a workpiece with a laser beam, said working head comprising:
   a housing with an inlet opening and an outlet opening for the laser beam;
   a focusing optical system for focusing the laser beam at a point outside said housing, the laser beam traversing said focusing optical system along a first beam axis and the laser beam exiting said housing via said outlet opening along a second beam axis, wherein said first beam axis and said second beam axis are at a non-zero angle to one another; and
   a measuring arrangement, located adjacent said outlet opening, for measuring a spacing between said measuring arrangement and the workpiece in a direction along said second beam axis.

2. The working head according to claim 1, wherein said measuring arrangement surrounds said outlet opening.

3. The working head according to claim 1, wherein said non-zero angle is approximately 90 degrees.

4. The working head according to claim 1, further comprising:
   a beam deflecting element for deflecting the laser beam from said first beam axis to said second beam axis.

5. The working head according to claim 4, wherein said beam deflecting element is a plane mirror.

6. The working head according to claim 4, wherein said beam deflecting element is inserted into an opening in said housing.

7. The working head according to claim 6, wherein said beam deflecting element is seated on a support which is detachably connected to said housing.

8. The working head according to claim 7, wherein said support includes cooling ribs.

9. The working head according to claim 1, wherein said measuring arrangement includes a sensor electrode for capacitive distance measurement.

10. The working head according to claim 1, wherein said measuring arrangement includes a coil for inductive distance measurement.

11. The working head according to claim 1, wherein said focusing optical system is located inside said housing and is moveable relative to said housing along said first beam axis.

12. The working head according to claim 11, wherein said focusing system is also movable relative to said housing in a direction perpendicular to said first beam axis.

13. The working head according to claim 4, further comprising:
    a protective lens arrangement located in said second beam axis between said beam deflecting element and said outlet opening.

14. The working head according to claim 4, further comprising:
    a protective lens arrangement located in said first beam axis between said focusing optical system and said beam deflecting element.

15. The working head according to claim 4, wherein a portion of said housing, located between said focusing optical system and said beam deflecting element, is telescoping.

16. The working head according to claim 15, wherein a focal length of said focusing optical system can be varied as a function of a length of said portion of said housing that is telescoping.

17. The working head according to claim 4, wherein a portion of said housing, located between said inlet opening and said focusing optical system, is telescoping.

18. The working head according to claim 1, wherein a first portion of said housing, containing said outlet opening, is tiltable and/or pivotable relative to a second portion of said housing, containing said focusing optical system.

* * * * *